United States Patent
Pollock et al.

(10) Patent No.: US 11,261,799 B2
(45) Date of Patent: Mar. 1, 2022

(54) COMBINED BALL VALVE FOR COMPRESSOR BLEED AIR AND METHODS

(71) Applicants: Shawn Justin Pollock, Timnath, CO (US); Steven Charles Stumbo, Severance, CO (US)

(72) Inventors: Shawn Justin Pollock, Timnath, CO (US); Steven Charles Stumbo, Severance, CO (US)

(73) Assignee: Woodward, Inc., Rockford, IL (US)

( * ) Notice: Subject to any disclaimer, the term of this patent is extended or adjusted under 35 U.S.C. 154(b) by 1862 days.

(21) Appl. No.: 14/248,015

(22) Filed: Apr. 8, 2014

(65) Prior Publication Data

US 2015/0285143 A1 Oct. 8, 2015

(51) Int. Cl.
  *F02C 9/18*  (2006.01)
  *F16K 11/087*  (2006.01)
  *F04D 27/02*  (2006.01)

(52) U.S. Cl.
  CPC .............. *F02C 9/18* (2013.01); *F04D 27/023* (2013.01); *F04D 27/0215* (2013.01); *F16K 11/0876* (2013.01)

(58) Field of Classification Search
  CPC .... F02C 9/18; F16K 11/0876; F04D 27/0215; F04D 27/023
  See application file for complete search history.

(56) References Cited

U.S. PATENT DOCUMENTS

| | | | | |
|---|---|---|---|---|
| 2,503,639 A | * | 4/1950 | Snyder | F16K 5/0464 137/625.47 |
| 2,533,931 A | * | 12/1950 | Hartley | F16K 5/0414 251/174 |
| 3,536,100 A | * | 10/1970 | Shum, Jr. | F16K 11/085 137/625.47 |
| 5,361,801 A | | 11/1994 | Kerpan et al. | |
| 6,065,773 A | * | 5/2000 | Klinger | B60R 21/268 222/54 |
| 6,135,414 A | | 10/2000 | Mohtar | |
| 6,250,066 B1 | | 6/2001 | Lawrence et al. | |
| 7,954,513 B2 | * | 6/2011 | Engelbrecht | F16K 11/0873 137/625.47 |
| 8,794,264 B2 | * | 8/2014 | Bartnick | F16J 15/062 137/625.28 |
| 2005/0067593 A1 | | 3/2005 | Wilfert et al. | |
| 2008/0099712 A1 | | 5/2008 | DeYoe | |

(Continued)

FOREIGN PATENT DOCUMENTS

| | | |
|---|---|---|
| CN | 101479513 A1 | 7/2009 |
| WO | WO 2007/136517 A2 | 11/2007 |
| WO | WO 2013/088946 A1 | 6/2013 |

*Primary Examiner* — Michael R Reid
(74) *Attorney, Agent, or Firm* — Reinhart Boerner Van Deuren P.C.

(57) ABSTRACT

A combined ball valve for compressor bleed air modulation is provided. The combined ball valve includes a housing defining an inlet, and first and second outlets. A metering element is positioned within the housing and within a flow path extending from the inlet to the first and second outlets. The metering element includes first and second flow ports and is rotatable within the housing to modulate compressor bleed air from the inlet to neither, one, or both of the first and second outlets. The combined ball valve utilizes high temperature materials in a relatively lightweight package.

7 Claims, 10 Drawing Sheets

(56) References Cited

U.S. PATENT DOCUMENTS

2009/0223657 A1\* 9/2009 Hollis .................. F16K 11/085
165/287
2012/0167589 A1 7/2012 Fritsch
2014/0305154 A1 10/2014 Yoshioka et al.

\* cited by examiner

COMBINED BALL VALVE FOR COMPRESSOR BLEED AIR AND METHODS

FIELD OF THE INVENTION

This invention generally relates to turbine engines, and more specifically to apparatus and methods for modulating bleed air from the compressor stages of a turbine engine.

BACKGROUND OF THE INVENTION

It is generally known in the art to syphon or "bleed" air from a compressor section of a turbine engine upstream from the combustion section. Such bleed air is used for a variety of functions including but not limited to cabin pressurization, engine operability, powering of pneumatic actuators, anti-icing, etc.

Contemporary systems modulate such bleed air through the use of multiple air valves. Each air valve is in fluid communication with a certain portion of the compressor section. Controlling the restriction offered by the internal metering element of each air valve controls the amount of bleed air that is allowed to flow from the compressor section. This modulated bleed air flows from each air valve to its appropriate destination to achieve one or more of the exemplary functions identified above.

Unfortunately, such contemporary systems are complex. Indeed, they typically involve multiple stand-alone air valves each having an independent actuator, or at least multiple separate flow bodies controlled by a single actuator, each being connected to the single actuator by way of a relatively complex linkage. As one example, a stage of compressor section may utilize two stand-alone air valves each having an actuator, or two separate flow bodies connected by way of a linkage to a single actuator. Each of the two air valves or flow bodies has its own respective inlet and outlet, and thus requires appropriate routing of conduit to and from each inlet and outlet to achieve its functionality.

While the above systems have proven to sufficiently modulate bleed air, they also have a large overall engine foot print, have a large part count, are generally complex in their linkages, and tend to be high cost. As such, there is a need in the art for an apparatus and method that modulates bleed air while presenting a reduction of parts yet a retention of function. Such a system would result in a smaller foot print, less complex, and less costly arrangement.

The invention provides such an apparatus and method. These and other advantages of the invention, as well as additional inventive features, will be apparent from the description of the invention provided herein.

BRIEF SUMMARY OF THE INVENTION

In one aspect, the invention provides an air valve for modulating bleed air from the compressor section of a turbine engine. The air valve includes a housing defining an inlet and first and second outlets, wherein a flow path extends through the housing and between the inlet and first and second outlets. A metering element is disposed within the housing and within the flow path. The metering element includes a first flow port and a second flow port. The metering element has a side wall with a curved outer periphery. The first and second flow ports extend through the side wall. The first port has a width which extends along the curved outer periphery at a first arc length. The second port has a width which extends along the curved outer periphery at a second arc length greater than the first arc length.

In another aspect, the invention provides an air valve for modulating bleed air from the compressor section of a turbine engine. The air valve includes a housing defining an inlet and first and second outlets. A flow path extends through the housing and between the inlet and first and second outlets. The first outlet has a first diameter, and the second outlet has a second diameter greater than the first diameter. A metering element is disposed within the housing and within the flow path. The metering element includes a first flow port and a second flow port. The metering element has a side wall. The first and second flow ports extend through the side wall. The first flow port has a first height. The second flow port has a second height greater than the first height.

The air valve may also include first and second shoes disposed on either side of the metering element. The first shoe is operable to communicate bleed air received from the first flow port to the first outlet. The second shoe is operable to communicate bleed air received from the second flow port to the second outlet. A first biasing element is interposed between a shoulder of the first shoe and an internal surface of the housing to bias the first shoe against the side wall of the metering element. A second biasing element is interposed between a shoulder of the second shoe and an internal surface of the housing to bias the second shoe against the sidewall of the metering element. The shoulders of each of the first and second shoes define a contact surface having an angle of about 20 degrees to about 70 degrees relative to an axis extending between the first and second outlets. The contact surface is in sealing contact with the side wall of the metering element.

In certain embodiments, at least one of the housing and metering element are formed from a high temperature material. In certain embodiments, the first and second shoes are formed from a high temperature material. The metering element may be rotationally supported within the housing by upper and lower bearings.

In yet another aspect, the invention provides an air valve assembly for modulating bleed air from a compressor section of a turbine engine. The air valve assembly includes an actuator and an air valve, the actuator mounted to the air valve. The air valve includes a housing having an inlet and first and second outlets, wherein a flow path extends between the inlet and first and second outlets. A metering element having a generally ellipsoid shape is disposed within the housing and within the flow path. The inlet is configured to receive bleed air from multiple distinct and independent sources from the compressor section. The actuator is operably connected to a valve stem of the metering element to rotate the metering element to modulate bleed air from the multiple distinct and independent sources of the compressor section between the first and second outlets.

The metering element includes a first flow port and a second flow port. The first and second flow ports have differing geometry. The first flow port is selectively alignable with the first outlet to fluidly communicate the first flow port with the first outlet and the second flow port is selectively alignable with the second outlet to fluidly communicate the second flow port with the second outlet.

The first and second flow ports are arranged such that the metering element is rotatable to a first position wherein a portion of the first flow port is in fluid communication with the first outlet and the second flow port is not in fluid communication with the second outlet. The metering element is rotatable to a second position wherein a portion of the first flow port is in fluid communication with the first outlet and the entirety of the second flow port is in fluid communication with the second outlet. The metering element is also rotatable to a third position wherein neither of the first and second flow ports are in fluid communication with the first and second outlets, respectively. The first flow port is generally semi-circular, and the second flow port is generally slotted in shape.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
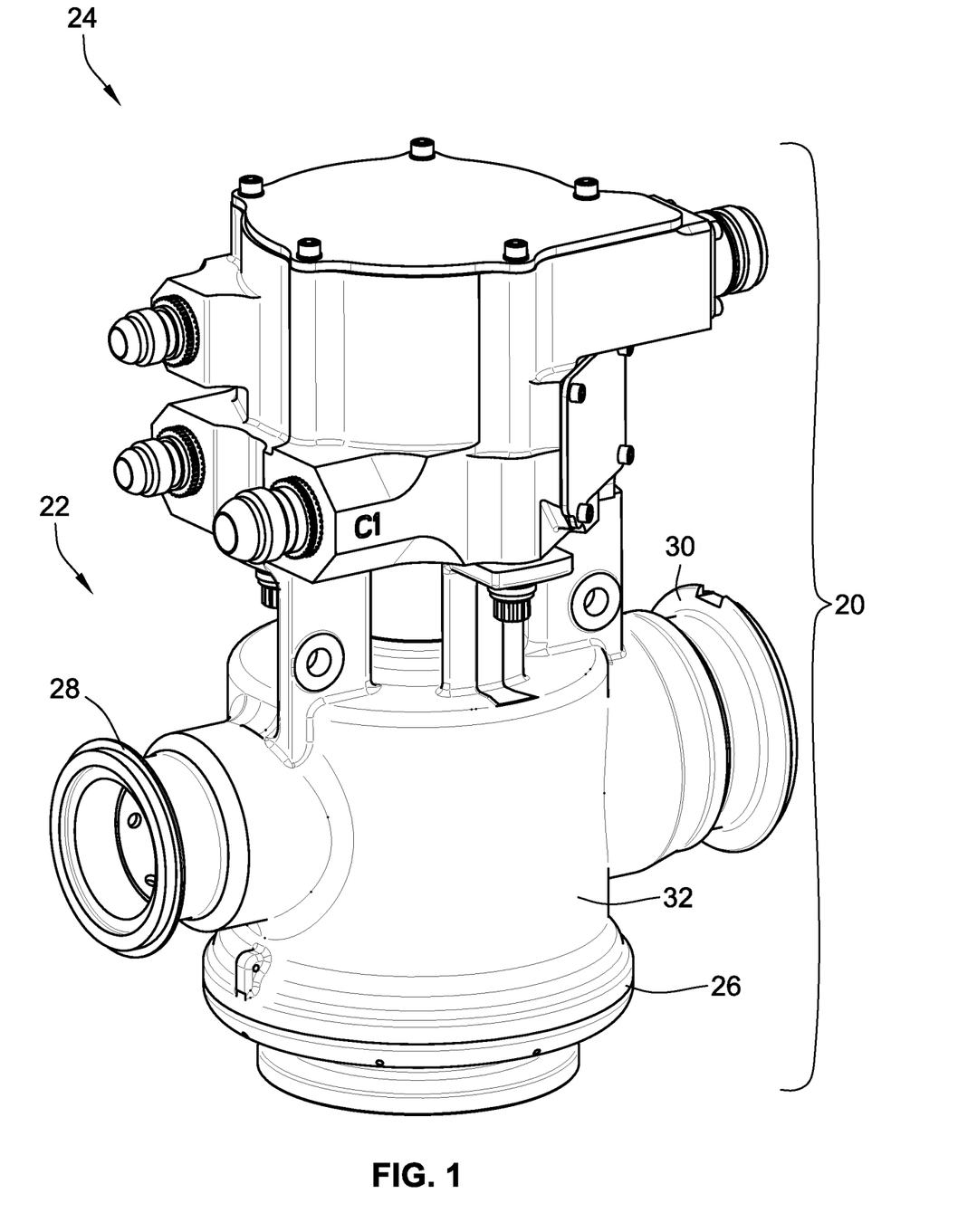
FIG. 1 is a perspective view of an embodiment of an air valve assembly according to the teachings of the present invention.

Turning now to the drawings, FIG. 1 illustrates one embodiment of an air valve assembly 20 according to the teachings of the present invention. Air valve assembly 20 includes an air valve 22 coupled with an actuator 24. As will be explained in greater detail below, air valve 22 advantageously provides a combined air valve which provides the functionality of the contemporary systems described above which utilize two separate air valves or flow bodies but does so in a single air valve package with a single actuator. Additionally, air valve 22 advantageously operates across a broad temperature range. As one example, air valve 22 may modulate air flow there through at a temperature ranging from about negative 100° F. to about 1200° F. While air valve 22 advantageously provides the functionality previously provided by two separate air valves, air valve 22 is advantageously driven by a single actuator 24 unlike prior designs. This actuator 24 is directly coupled to air valve 22 and thus the above described complex linkages are not required with the instant invention.

Actuator 24 may be any appropriate actuator designed for actuating a ball valve type apparatus. As non-limiting examples actuator 24 may be a linear, rotary, hydraulic, fueldraulic, or an electromagnetic type actuator. In the illustrated embodiment, those skilled in the art will recognize that actuator 24 is shown as a hydraulic or fueldraulic type actuator. Such illustration should be taken by way of example and not limitation.

Still referring to FIG. 1, air valve 22 includes an inlet 26 and first and second outlets 28, 30. The aforementioned inlet 26 and first and second outlets 28, 30 are defined by a housing 32 which may be made from a high temperature material.

Figure 2:
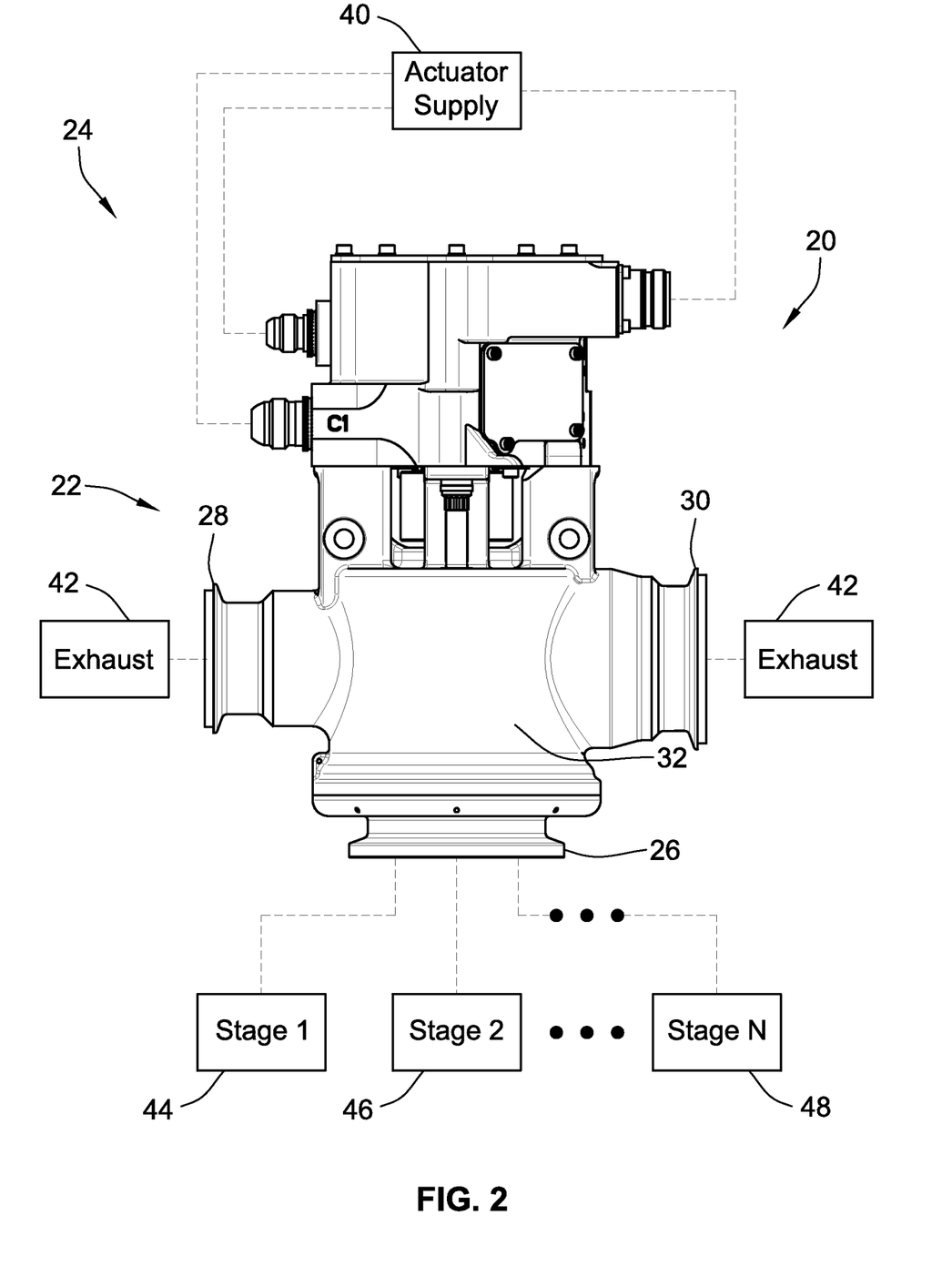
FIG. 2 is a side view of the air valve assembly of FIG. 1 with schematic representations of the various inputs and outputs thereof.

Inlet 26 is configured to receive bleed air from multiple stages of the compressor section of a turbine engine. As illustrated in FIG. 2, these stages are represented schematically ranging from stage 1 to stage N at 44, 26, 48 and are in effect multiple distinct and independent sources of bleed air. The first and second outlets 28, 30 are operably connected to an exhaust path schematically represented as exhaust 42. Exhaust 42 may be a single flow path to which each first and second outlets 28, 30 are connected to, or in the alternative, may be separate flow paths with first and second outlets 28, 30 respectively connected thereto. Compressor bleed air modulated through either or both of first and second outlets 28, 30 may be used for a variety of functions as is known in the art, e.g. for de-icing operations, for maintaining optimal air pressure within the compressor section, etc. Those skilled in the art will also recognize that flow through air valve 22 may be reversed such that inlet 26 in effect functions as an outlet of air valve 22, and first and second outlets 28, 30 in effect function as inlets. Additionally, although second outlet 30 is illustrated as having a larger diameter than first outlet 28, first and second outlets 28, 30 may have a common diameter, or the diameter of first outlet 28 may be larger than the diameter of second outlet 30 in other embodiments.

Actuator 24 is also operably connected to actuator supply 40. The particular characteristics of actuator supply 40 will vary depending on the type of actuator embodied by actuator 24. As stated above, in the illustrated embodiment, actuator 24 is a hydraulic or fueldraulic actuator. As such, actuator supply 40 may be a hydraulic supply system for controlling actuator 24 and optionally other actuators. In the case of a fueldraulic actuator supply 40 may be part of a fuel supply system, particularly, the actuator supply portion thereof.

Figure 3:
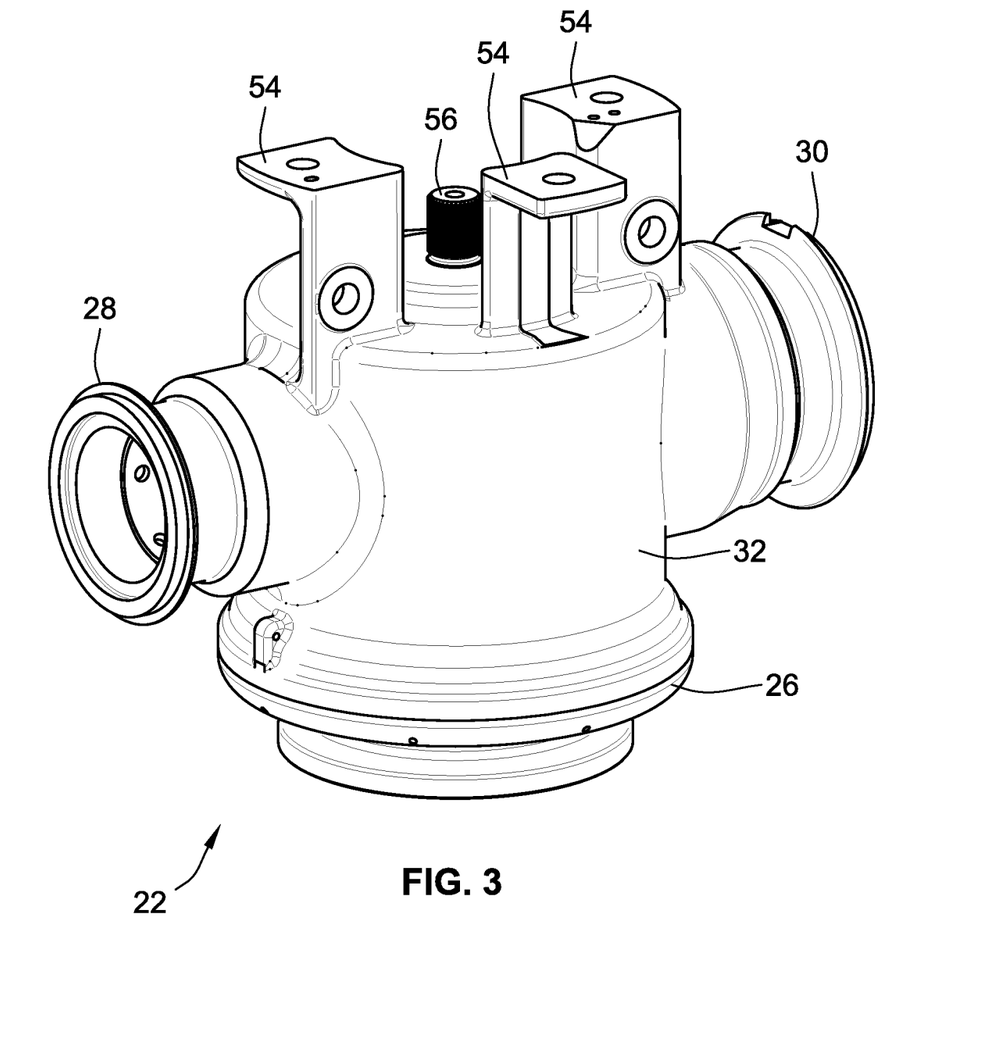
FIG. 3 is a perspective view of an air valve of the air valve assembly of FIG. 1.

Turning now to FIG. 3, air valve 22 provides several actuator mounts 54 for mounting actuator 24 (see FIG. 2) to air valve 22. A valve stem 56 extends outwardly through housing 32 for connection to actuator 24. Valve stem 56 is operably coupled to an internal metering element 58 of air valve 22 for modulating bleed air as described herein.

Figure 4:
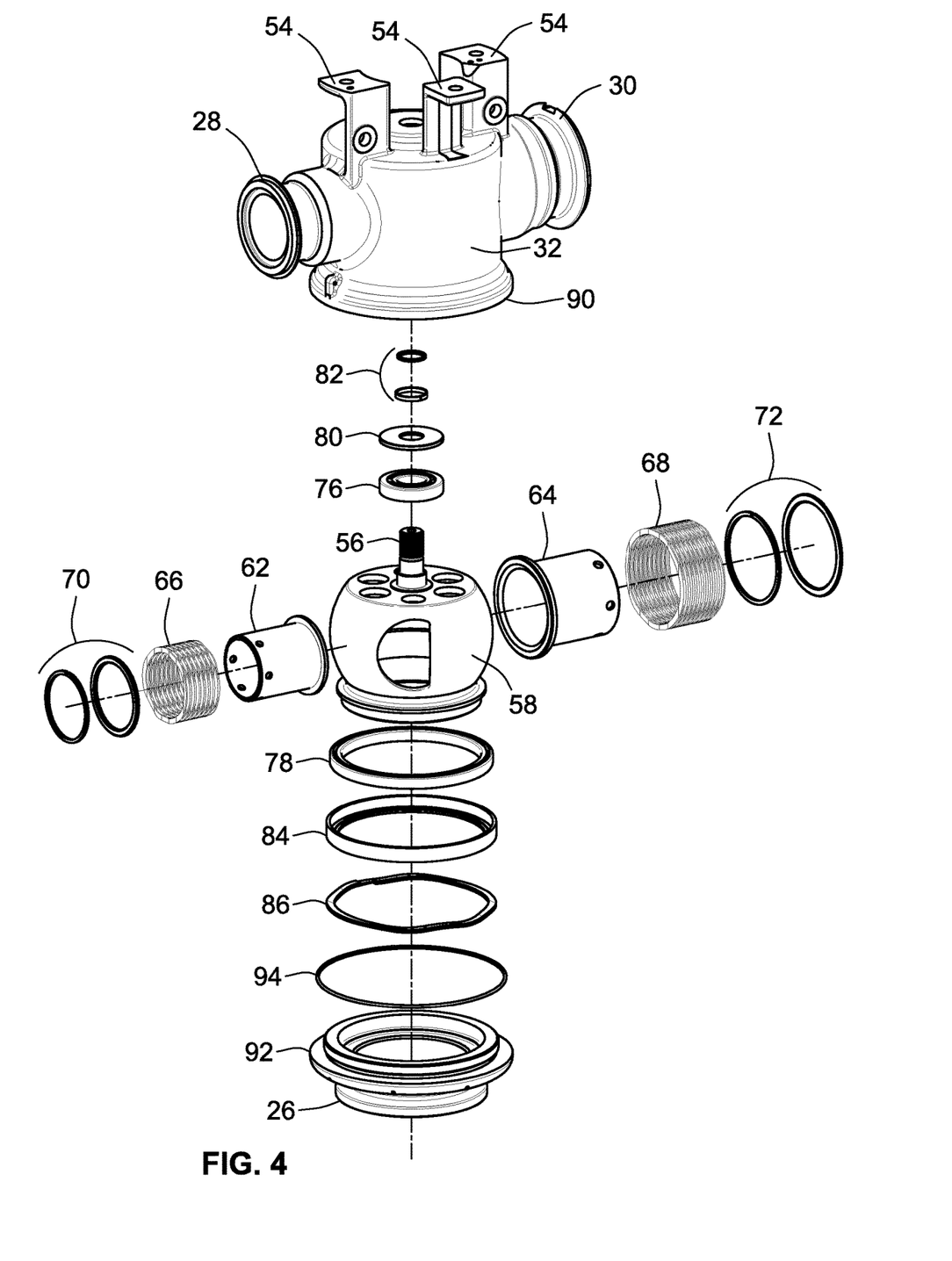
FIG. 4 is a perspective exploded view of the air valve of FIG. 3.

Turning now to FIG. 4, air valve 22 is illustrated in an exploded view to expose the internal componentry thereof. As can be seen in this view, the above described valve stem 56 and metering element 58 are shown. Shoes 62, 64 are disposed on either side of metering element 58 and are biased there against by biasing elements 66, 68, respectively. Additionally, multi-part seals, 70, 72 are disposed at the end of shoes 62, 64, respectively for preventing bleed air within air valve 22 from circumventing its required passage through shoes 62, 64 to reach first and second outlets 28, 30, respectively. Biasing elements 66, 68 respectively bias shoes 62, 64 against the exterior of metering element 58 and provide a surface unit loading sufficient to sealingly bias a sealing surface of each of shoes 62, 64 against metering element 58. This unit loading may differ depending upon application, as those skilled in the art will recognize. Metering element 58 and shoes 62, 64 may be made from high temperature materials. Additionally, these components may also incorporate high temperature coatings.

Shoes 62, 64 ensure that bleed air routed through inlet 26 must first pass through metering element 58 before exiting out of one or both of first and second outlets 28, 30. Although shoes 62, 64 are illustrated as biased against metering element 58 using biasing elements 66, 68, in an alternative embodiment, a bellows may also be utilized in place of each shoe 62, 64 and its associated biasing element 66, 68. Such a configuration provides for the aforementioned routing capabilities of shoes 62, 64, while also providing the biasing force otherwise provided by biasing elements 66, 68.

Metering element 58 is supported for rotation about an axis passing through valve stem 56 by upper and lower bearings 76, 78. A washer and multi-part seal 82 are disposed above upper bearing 76 to prevent bleed air from leaking out of housing 32 due to the passage of valve stem 56 there through.

A support ring 84 supports lower bearing 78 and indirectly supports metering element 58 within housing 32. A biasing element 86 in the form of a wave spring provides an upward biasing force against support ring 84 to firmly position metering element 58 within housing 32. An upper portion of housing 32 also defines a sealing surface against which a cap 92 of housing seals. A seal 94 is positioned between cap 92 and the remainder of housing 32.

Figure 5:
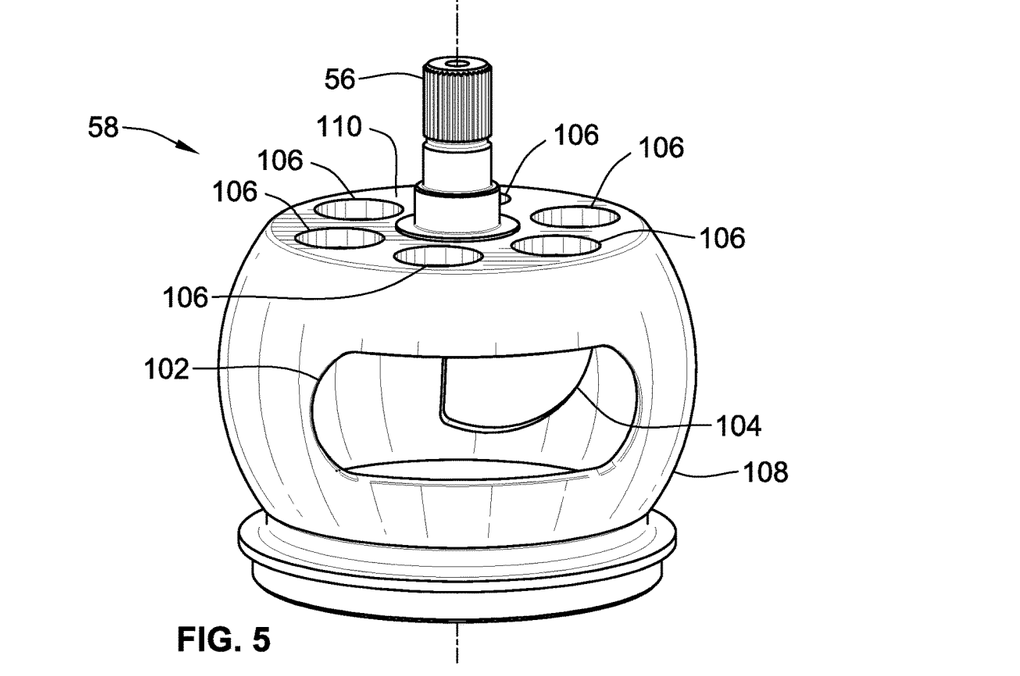
FIG. 5 is a perspective view of a metering element of the air valve of FIG. 3.

Having introduced the components of air valve 22, a description will now be provided for the particular features of metering element 58 relative to FIGS. 5-8. With particular reference to FIG. 5, metering element 58 includes a first flow port 102 and a second flow port 104. As will be described in greater detail below, first and second flow ports 102, 104 have differing geometry to achieve the compressor bleed air functionality described herein, although the particular geometry illustrated should be taken by way of example only. Indeed, other port geometries are contemplated. These first and second flow ports 102, 104 are formed through a side wall 108 of metering element 58. Additionally, a plurality of apertures 106 are formed through a top wall 110 of metering element 58. As can be seen from inspection of FIG. 5, metering element 58 is generally ellipsoid in shape with the exception that it has a flat top and a flanged configuration at the bottom thereof. In other embodiments, metering element may be spherical or any other shape depending upon application.

Figure 6:
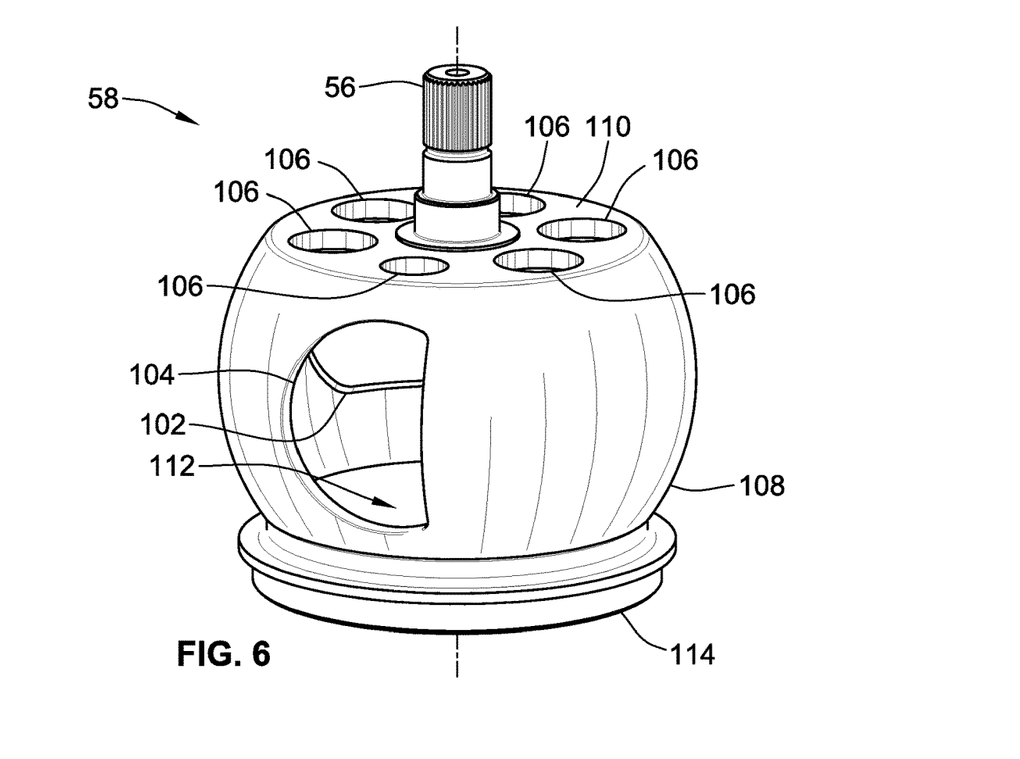
FIG. 6 is another perspective view of the metering element of FIG. 5.

With reference now to FIG. 6, an opening 112 is formed through a bottom wall 114 of metering element 58. This opening 112 communicates with inlet 26 (See FIG. 2) of air valve 22. Bleed air is allowed to flow in through opening 112, and depending upon the rotational position of metering element 58, out of either, both, or none of first and second outlets 28, 30.

Figure 7:
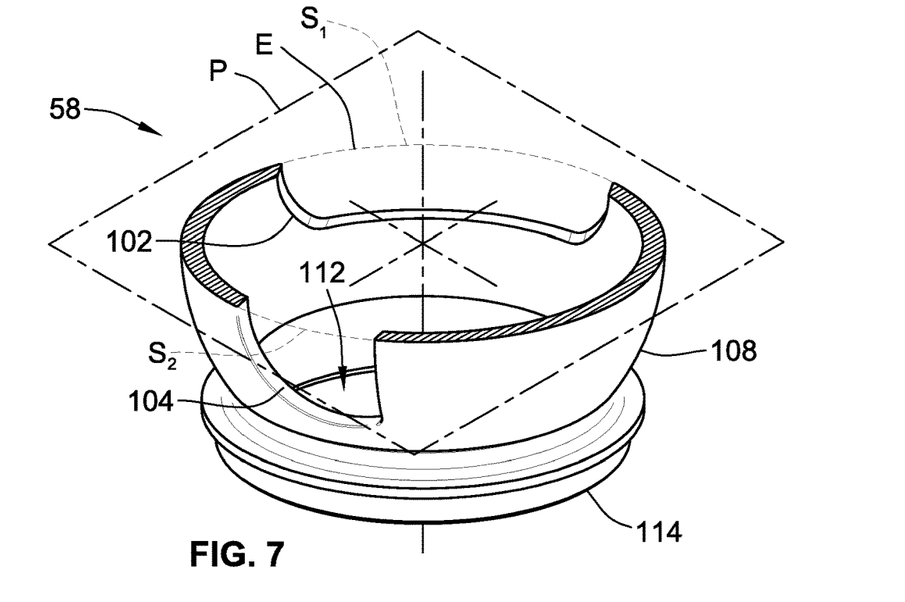
FIG. 7 is a perspective cross section of the metering element of FIG. 5.
Figure 8:
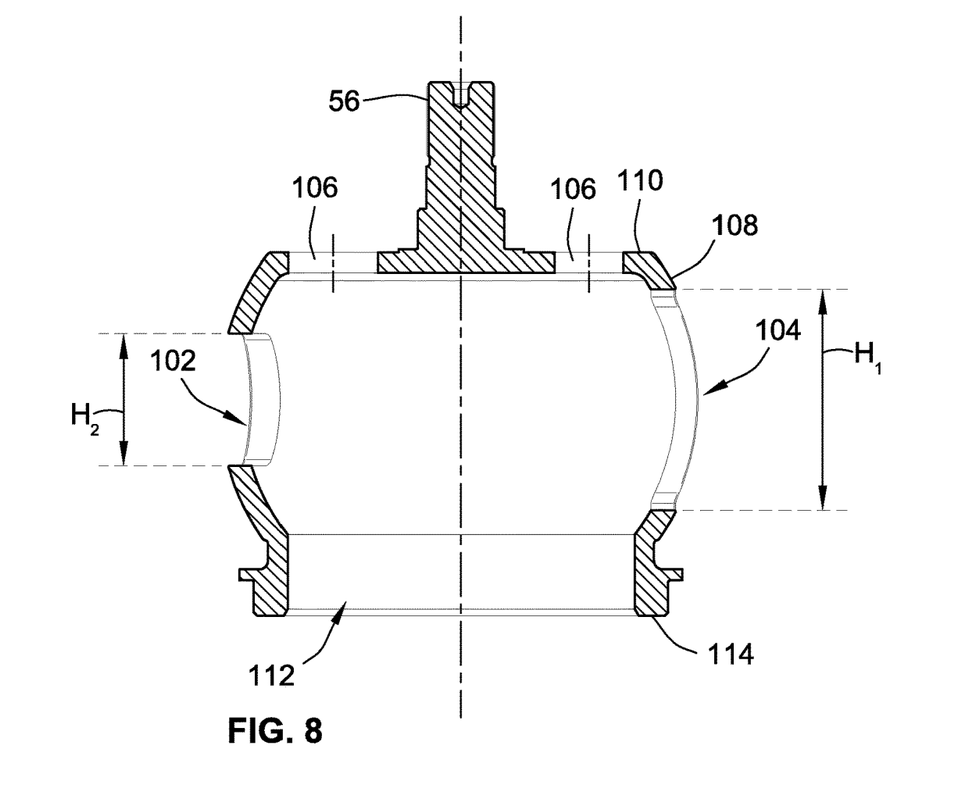
FIG. 8 is a side cross section of the metering element of FIG. 5.

Turning now to FIGS. 7 and 8, several geometrical descriptions will be provided for first and second flow ports 102, 104. With particular reference to FIG. 7, a cross section of metering element 58 is illustrated taking it through a plane P within which the geometrical centroids of first and second flow ports 102, 104 are disposed. An ellipse E is disposed within plane P and assumes the outer periphery of metering element 58. As can be seen in this view, the arc length $S_1$ of first flow port 102 is greater than the arc length $S_2$ of second flow port 104. With reference to FIG. 8, the overall height $H_1$ of second flow port 104 is greater than the overall height a of first flow port 102. This difference in port geometry allows for the modulation of bleed air to either, none, or both of first and second outlets 28, 30 as described below.

Figure 9:
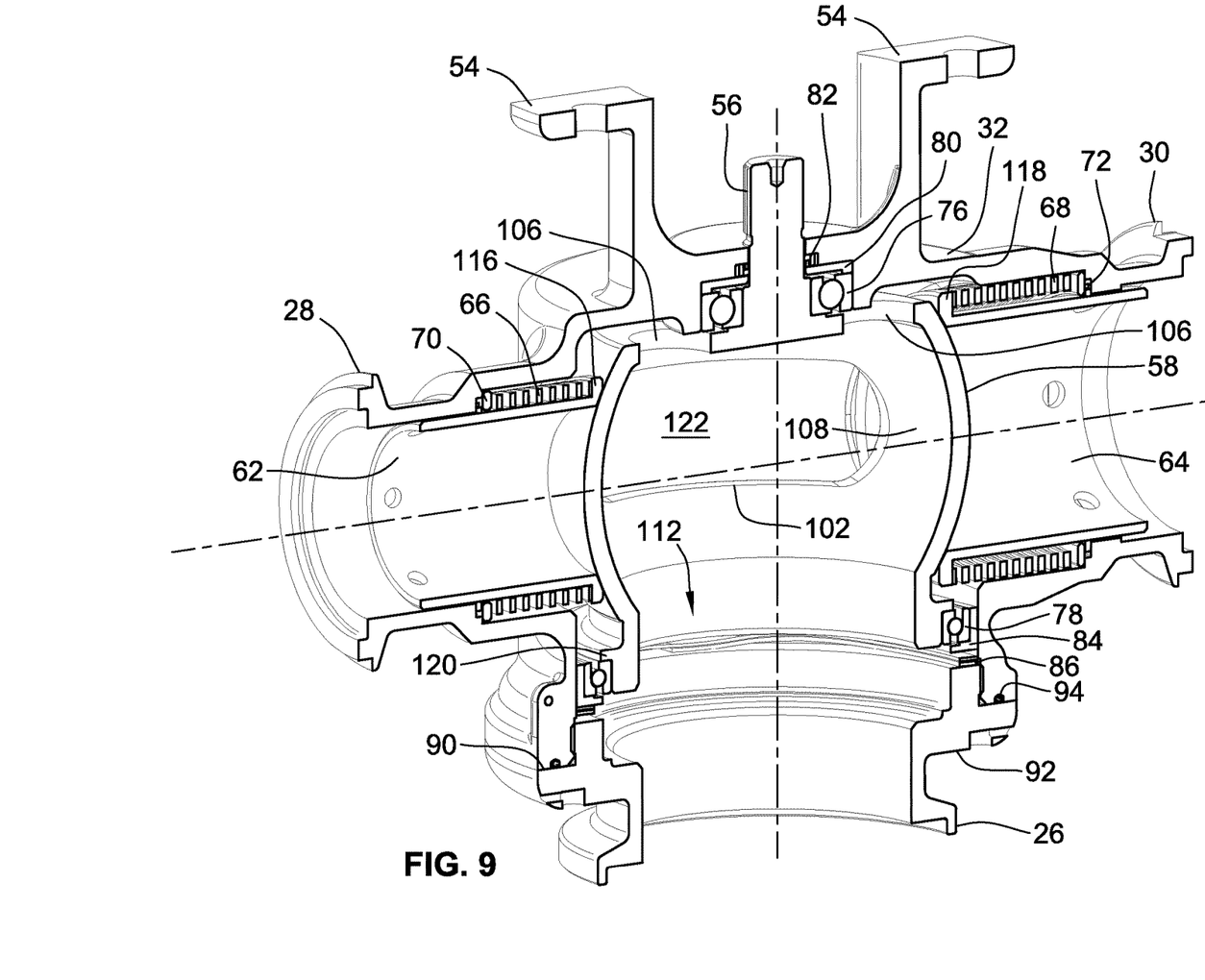
FIG. 9 is a side cross section of the air valve of FIG. 3.

Turning now to FIG. 9, a side cross section taken through air valve 22 is illustrated therein. As can be seen in this view, shoes 62, 64 respectively define shoulders 116, 118 which present an angled contact surface which as described above is biased against side wall 108 of metering element 58. The particular angle of the surface of shoulders 116, 118 which contacts side wall 108 is selected to ensure a desired sealing against metering element 28 as well as the above unit loading there against. This angle may range from about 20 degrees to about 70 degrees as one example. As can also be seen in the cross section of FIG. 9, the flange portion of metering element 58 defines a shoulder 120 which seats against a top surface of lower bearing 78 to aid in locating metering element 58 within housing 32.

Figure 10:
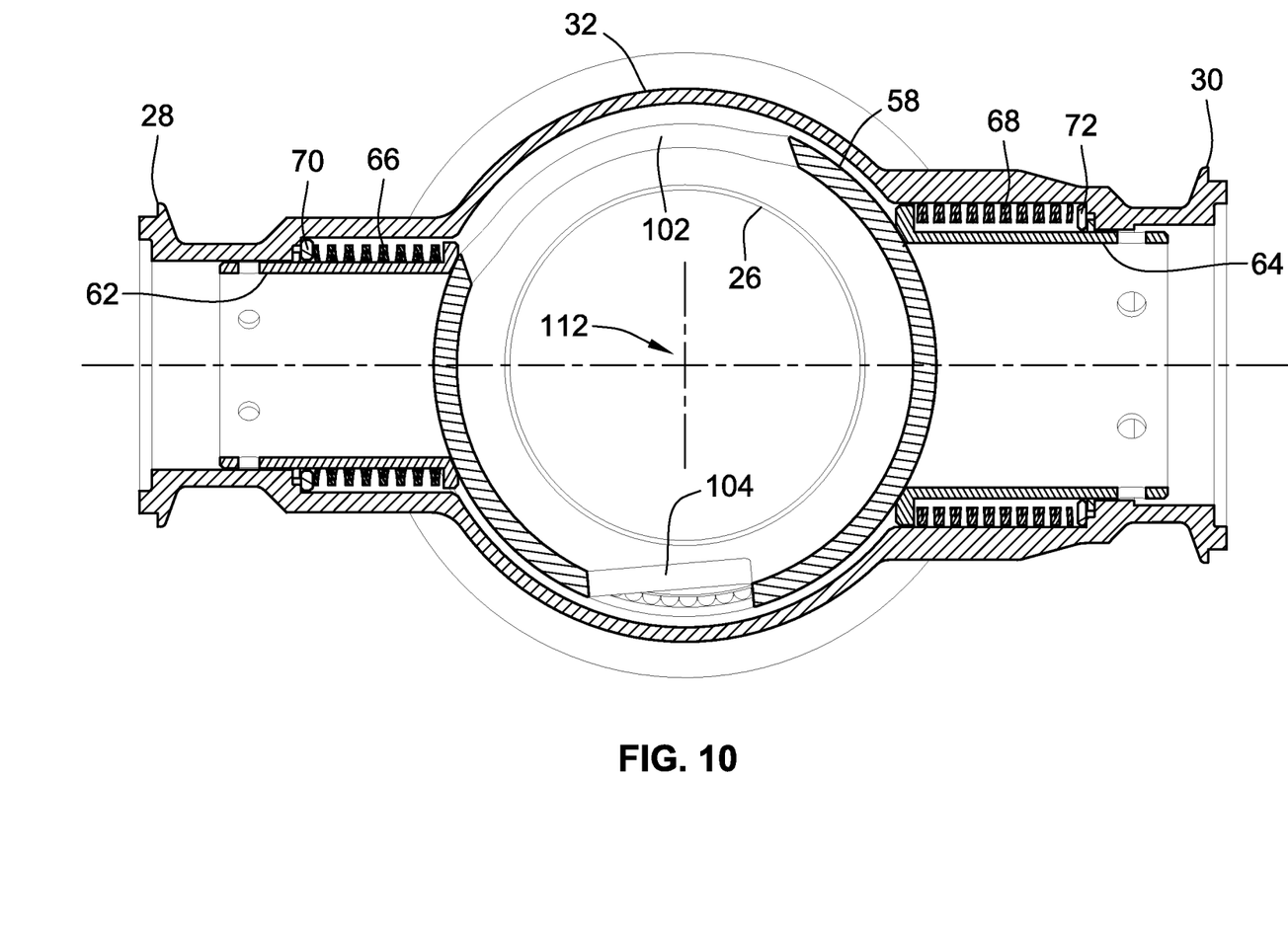
FIG. 10 is a top cross section of the air valve of FIG. 3 in one operational configuration.
Figure 11:
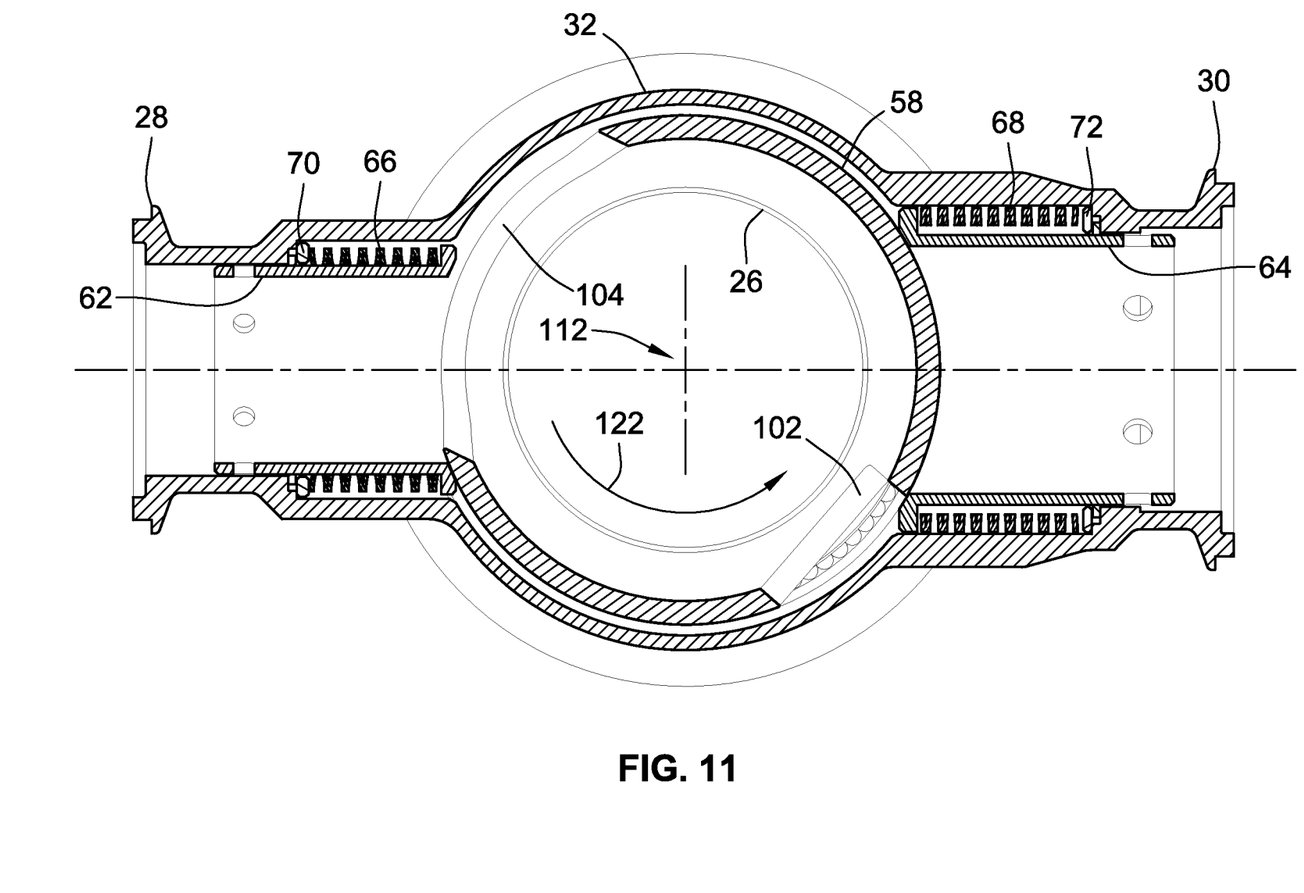
FIG. 11 is a top cross section of the air valve of FIG. 3 in another operational configuration.
Figure 12:
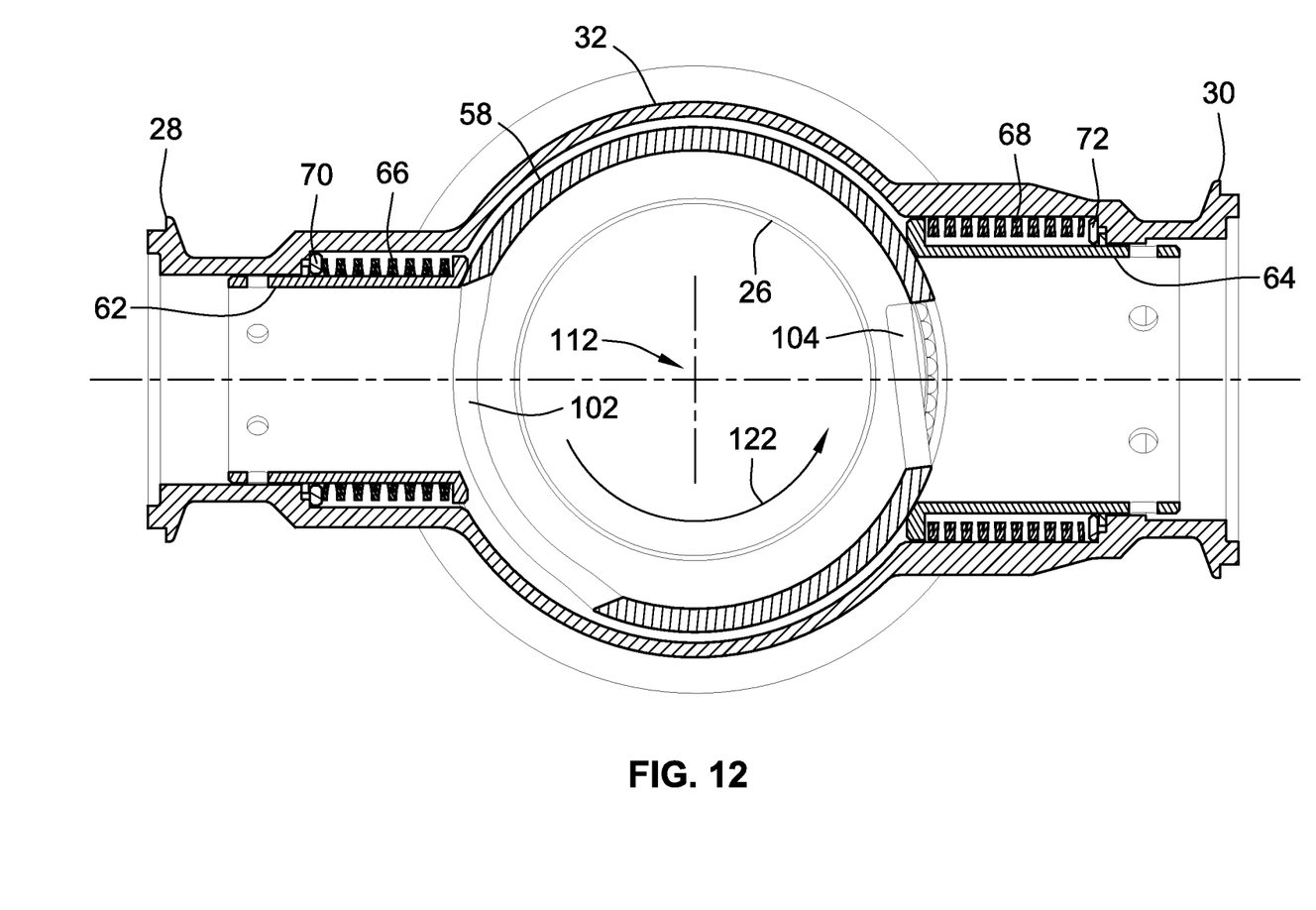
FIG. 12 is a top cross section of the air valve of FIG. 3 in another operational configuration.

Turning now to FIGS. 10-12, a description will be provided for the modulation capabilities of air valve 22. With particular reference to FIG. 10, the same illustrates a top cross section of air valve 22. As can be seen in this view, each of first and second flow ports 102, 104 are positioned such that flow of compressor bleed air from inlet 26 to first and second outlets 28, 30 is prevented. However, and with reference now to FIG. 11, rotation of metering element 58 in rotational direction 122 as illustrated will expose first flow port 102 to first outlet 28 as illustrated. However, second flow port 104 is not exposed to second outlet 30. As a result, incoming bleed air through inlet 26 is modulated exclusively through air valve 22 out of first outlet 28.

With reference now to FIG. 12, continued rotation in direction 122 will continue to expose first flow port 102 to first outlet 28. However, second flow port 104 is now additionally exposed to second outlet 30 as shown. As a result, compressor bleed air entering air vale 22 through inlet 26 is modulated through both the first and second outlets 28, 30. It should be immediately recognized that the particular shape of first and second flow ports 102, 104 thus allows for the modulation of bleed air through one, both, or neither of first and second outlets 28, 30. This advantageously allows for the regulation of bleed air two multiple exhaust paths (see exhaust 42 FIG. 1) using a single metering element of a single air valve controlled by a single actuator, unlike prior designs which require multiple flow bodies and in some cases multiple actuators.

As described above, various high temperature materials are utilized in air valve 22 to allow it to operate with high temperature compressor bleed air passing there through. Additionally, air valve 22 utilizes a generally thin wall thickness relative to its housing and flow to reduce weight. As such, air valve assembly 20 not only provides the functionality of systems which heretofore utilized two separate air valves, the same also does so without losing its ability to function in combined high temperature and high pressure environments.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air valve for modulating bleed air from the compressor section of a turbine engine, the air valve comprising:
   a housing defining an inlet and first and second outlets, wherein a flow path extends through the housing and between the inlet and first and second outlets;
   a metering element disposed within the housing and within the flow path, the metering element including a first flow port, and a second flow port, the metering element having a side wall with a curved outer periphery, the first and second flow ports extending through the side wall;
   a first and a second shoe disposed on either side of the metering element, the first shoe operable to communicate bleed air received from the first flow port to the first outlet, the second shoe operable to communicate bleed air received from the second flow port to the second outlet;
   wherein the first port has a width which extends along the curved outer periphery at a first arc length; and
   wherein the second port has a width which extends along the curved outer periphery at a second arc length greater than the first arc length;
   further comprising a first biasing element interposed between a shoulder of the first shoe and an internal surface of the housing to bias the first shoe against the side wall of the metering element and a second biasing element interposed between a shoulder of the second shoe and an internal surface of the housing to bias the second shoe against the sidewall of the metering element.

2. The air valve of claim 1, wherein the shoulders of each of the first and second shoes define a contact surface having an angle of about 20 degrees to about 70 degrees relative to an axis extending between the first and second outlets, the contact surface in sealing contact with the side wall of the metering element.

3. An air valve for modulating bleed air from the compressor section of a turbine engine, the air valve comprising:
   a housing defining an inlet and first and second outlets, wherein a flow path extends through the housing and between the inlet and first and second outlets;
   a metering element disposed within the housing and within the flow path, the metering element including a first flow port, and a second flow port, the metering element having a side wall with a curved outer periphery, the first and second flow ports extending through the side wall;
   a first and a second shoe disposed on either side of the metering element, the first shoe operable to communicate bleed air received from the first flow port to the first outlet, the second shoe operable to communicate bleed air received from the second flow port to the second outlet;
   wherein the first port has a width which extends along the curved outer periphery at a first arc length;
   wherein the second port has a width which extends along the curved outer periphery at a second arc length greater than the first arc length; and
   wherein at least one of the housing and metering element are formed from a high temperature material.

4. An air valve for modulating bleed air from the compressor section of a turbine engine, the air valve comprising:
   a housing defining an inlet and first and second outlets, wherein a flow path extends through the housing and between the inlet and first and second outlets;
   a metering element disposed within the housing and within the flow path, the metering element including a first flow port, and a second flow port, the metering element having a side wall with a curved outer periphery, the first and second flow ports extending through the side wall;
   a first and a second shoe disposed on either side of the metering element, the first shoe operable to communicate bleed air received from the first flow port to the first outlet, the second shoe operable to communicate bleed air received from the second flow port to the second outlet
   wherein the first port has a width which extends along the curved outer periphery at a first arc length;
   wherein the second port has a width which extends along the curved outer periphery at a second arc length greater than the first arc length; and
   wherein the first and second shoes are at least one of formed from a high temperature material or include a high temperature coating.

5. An air valve for modulating bleed air from the compressor section of a turbine engine, the air valve comprising:
   a housing defining an inlet and first and second outlets, wherein a flow path extends through the housing and between the inlet and first and second outlets;
   a metering element disposed within the housing and within the flow path, the metering element including a first flow port, and a second flow port, the metering element having a side wall with a curved outer periphery, the first and second flow ports extending through the side wall;
   a first and a second shoe disposed on either side of the metering element, the first shoe operable to communicate bleed air received from the first flow port to the first outlet, the second shoe operable to communicate bleed air received from the second flow port to the second outlet;

wherein the first port has a width which extends along the curved outer periphery at a first arc length;

wherein the second port has a width which extends along the curved outer periphery at a second arc length greater than the first arc length; and wherein the metering element is rotationally supported within the housing by upper and lower bearings.

6. An air valve for modulating bleed air from the compressor section of a turbine engine, the air valve comprising:

a housing defining an inlet and first and second outlets, wherein a flow path extends through the housing and between the inlet and first and second outlets, the first outlet having a first diameter, the second outlet having a second diameter greater than the first diameter;

a metering element disposed within the housing and within the flow path, the metering element including a first flow port, and a second flow port, the metering element having a side wall the first and second flow ports extending through the side wall;

wherein the first port has a first height;

wherein the second port has a second height greater than the first height a first and a second shoe disposed on either side of the metering element, the first shoe operable to communicate bleed air received from the first flow port to the first outlet, the second shoe operable to communicate bleed air received from the second flow port to the second outlet and a first biasing element interposed between a shoulder of the first shoe and an internal surface of the housing to bias the first shoe against the side wall of the metering element and a second biasing element interposed between a shoulder of the second shoe and an internal surface of the housing to bias the second shoe against the sidewall of the metering element.

7. The air valve of claim 6, wherein the shoulders of each of the first and second shoes define a contact surface having an angle of about 20 degrees to about 70 degrees relative to an axis extending between the first and second outlets, the contact surface in sealing contact with the side wall of the metering element.

\* \* \* \* \*